United States Patent [19]

Parsonage et al.

[11] Patent Number: 5,250,580
[45] Date of Patent: Oct. 5, 1993

[54] FLAME RETARDANT POLYURETHANE FOAMS

[75] Inventors: John R. Parsonage; EDwin Metcalfe, both of London, England

[73] Assignee: Unilever Patent Holdings B.V., Vlaardingen, Netherlands

[21] Appl. No.: 844,486

[22] Filed: Mar. 4, 1992

[30] Foreign Application Priority Data

Mar. 4, 1991 [GB] United Kingdom ............... 9104495

[51] Int. Cl.$^5$ .............................................. C08J 9/12
[52] U.S. Cl. ..................................... 521/110; 521/122
[58] Field of Search ............................... 521/110, 122

[56] References Cited

U.S. PATENT DOCUMENTS

| | | |
|---|---|---|
| 3,598,772 | 10/1971 | Hood . |
| 4,218,502 | 8/1980 | Graham ............................. 521/122 |
| 4,243,755 | 1/1981 | Marx et al. ........................ 521/122 |
| 4,296,211 | 10/1981 | Blount ................................ 521/122 |
| 4,521,333 | 6/1985 | Graham et al. ................... 521/122 |
| 4,581,385 | 4/1986 | Smith et al. ....................... 521/122 |
| 4,594,362 | 6/1986 | Smith et al. ....................... 521/122 |
| 4,743,625 | 5/1988 | Vajs ................................... 521/122 |
| 4,795,765 | 1/1989 | Blount ................................ 521/122 |
| 4,871,477 | 10/1989 | Dimanshteyn .................... 252/609 |
| 4,940,844 | 7/1990 | Blount ................................ 521/122 |

FOREIGN PATENT DOCUMENTS

| | | |
|---|---|---|
| 480227 | 8/1975 | Australia . |
| 0023764 | 10/1984 | European Pat. Off. . |
| 0354632 | 2/1990 | European Pat. Off. . |
| 52-017598 | 2/1977 | Japan . |
| 52-047895 | 4/1977 | Japan . |

*Primary Examiner*—Morton Foelak
*Attorney, Agent, or Firm*—Cushman, Darby & Cushman

[57] ABSTRACT

A polyurethane foam contains, as a fire retardant, water-soluble silicate particles in an amount of at least 30 parts per 100 parts by weight of the polyol of the polyurethane, which silicate particles have an average size of at least 62 microns.

20 Claims, 2 Drawing Sheets

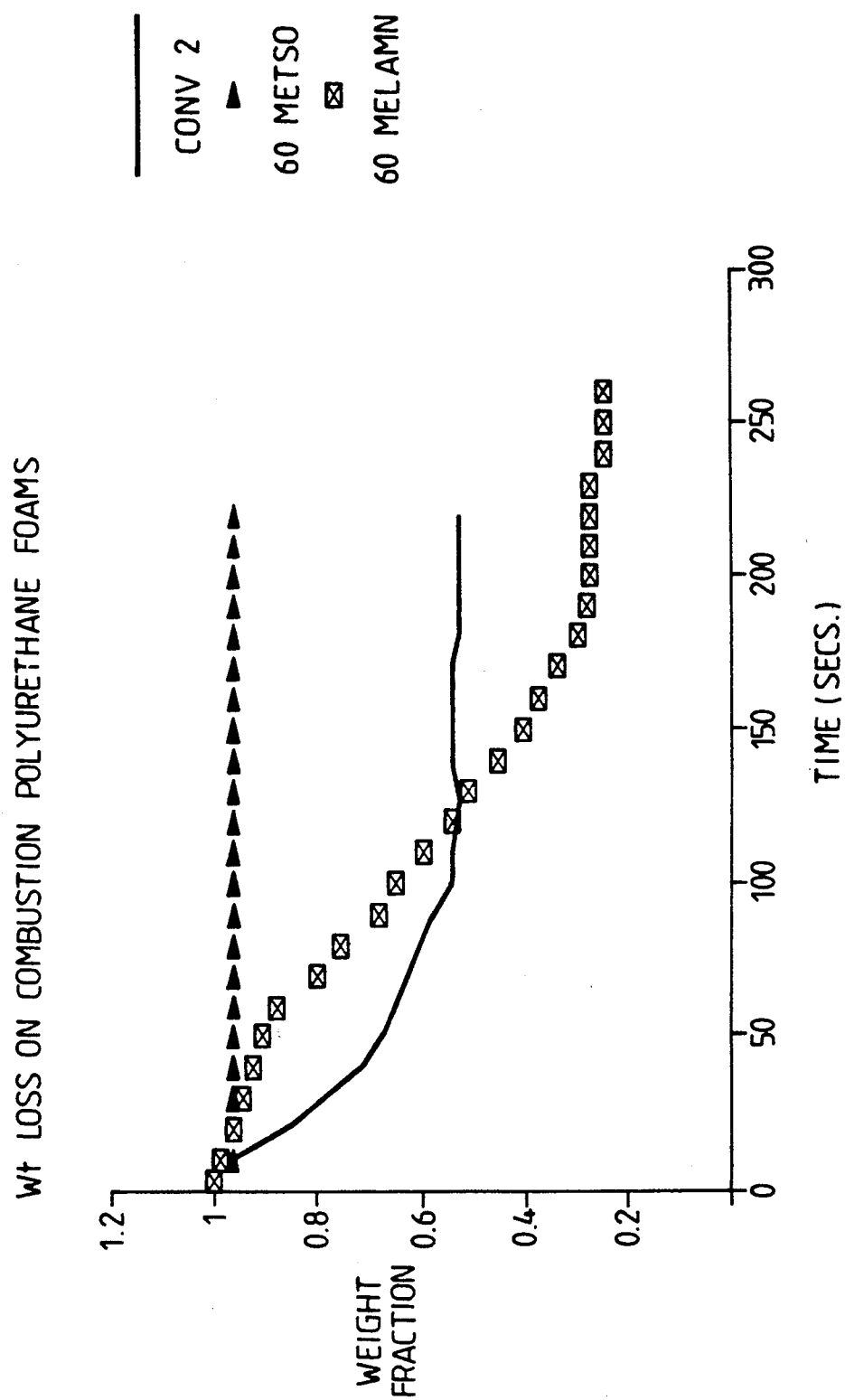

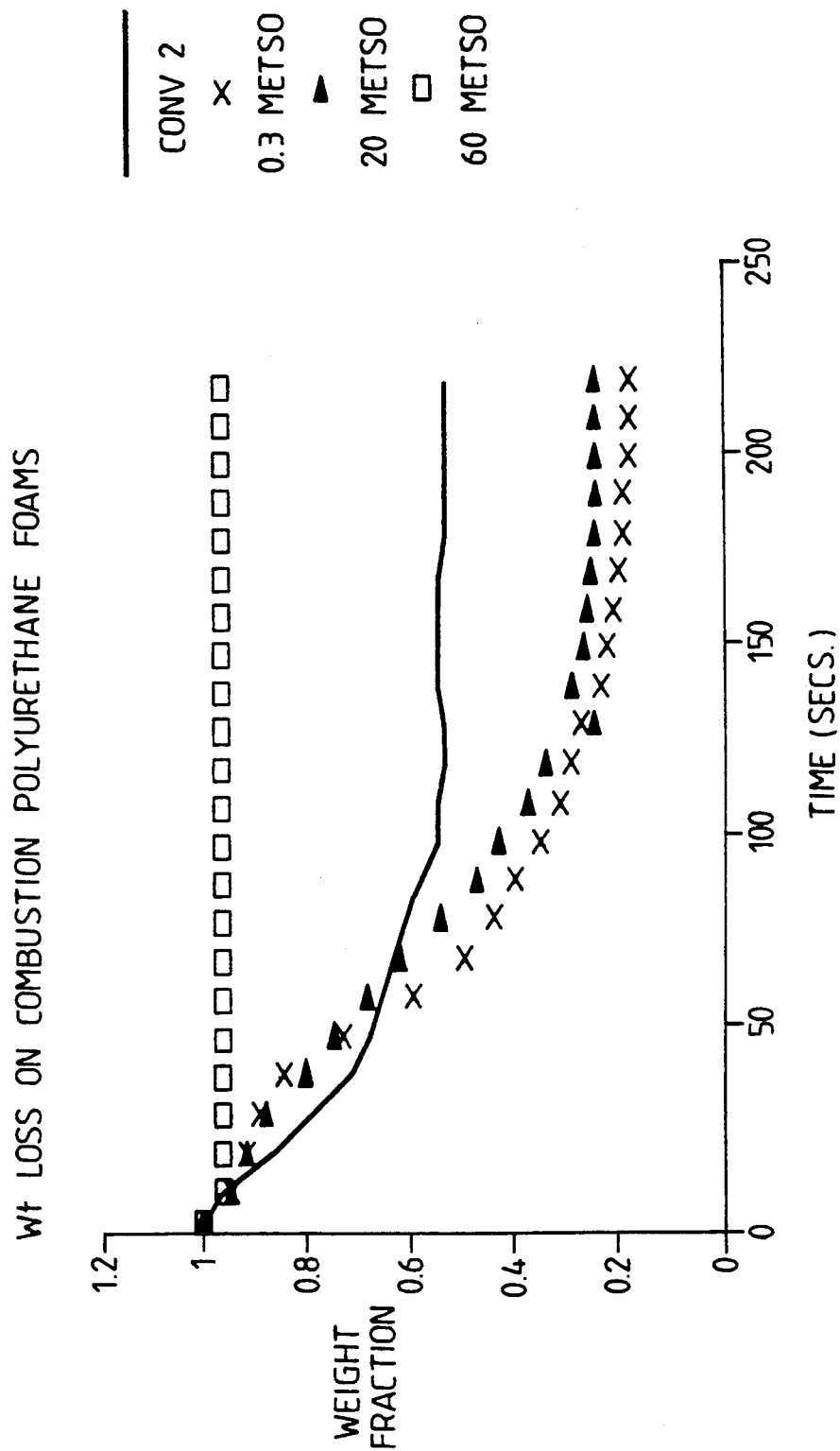

FLAME RETARDANT POLYURETHANE FOAMS

FIELD OF THE INVENTION

This invention relates to flame retardant polyurethane foams.

BACKGROUND OF THE INVENTION

Both flexible and rigid polyurethane foams have found wide use, but their flammability, with resulting toxic emissions has caused considerable difficulties. This is especially so for flexible foams which, on burning, depolymerise and melt to form a liquid which flows, burns, volatalises and causes flashover, ie the formation of a sudden sheet of flame.

In an attempt to avoid these difficulties, many flame retardants have been incorporated in the polyurethane foam, and a variety of mechanisms operate in which the retardants may act as any one or more of thermal barriers, depolymerisation inhibitors, flow inhibitors and moisture sinks.

Fire retardants which have been tried to date include inorganic additives, such as cement, graphite, talc, calcium oxide, hydrated alumina, silicates, silica and phosphorus compounds, and organic additives such as halogen compounds and melamine. The use of a mixture of inorganic and organic fire retardants is also known; see for example JP-A-53-26898 which describes the use of an alkali silicate powder, together with an organic halogen compound as flame retardant.

Some additives adversely affect the polymerization reaction and/or foaming process, especially where the additive carries water. In particular, the water tends to react with the isocyanate in the reaction mixture. There are also some additives which seriously impair the mechanical and other properties of the foam. For example, although hydrated alumina acts as an efficient water sink, it produces an adverse feel and prevents the formation of a low density foam, while graphite, in addition to being expensive, gives a black colouration. Other additives which we thought might prove useful, for example, cement, although inhibiting the onset of ignition, actually promote burning because, although they form a rigid char, this acts as a wick for the flame. Thus weight and heat loss are actually increased.

Likewise, melamine (a flame retardant which is currently popular) delays the onset of ignition. However, once ignition occurs, weight loss is actually no less than for a standard foam containing no fire retardant additive. Toxic emissions, including cyanides are also generated.

As an example of the above known flame retardants, it has long been known to use small particles, ie up to 60 mesh, of alkali metal silicate to inhibit the onset of ignition; see for example JP-A-52-17598.

U.S. Pat. No. -A-4871477 discloses the use of a water soluble alkali metal silicate powder in which water is retained. At fire temperatures, the silicate becomes fusible and water in the particles volatilises and expands the particles to produce rapidly an inorganic silicate foam which ultimately releases water, contributes to the formation of the barrier layer and has significant fire resistant properties. These particles have a maximum diameter of 60 microns. In the formulations specifically disclosed, the powder is employed in combination with "microexplosive" particles containing a compound capable of generating a gas, and in addition a phosphate flame retardant.

SUMMARY OF THE INVENTION

Surprisingly, we have found that, provided that the alkali metal silicate has a certain minimum particle size and is present in the correct proportions, a particularly excellent intumescent effect can be achieved. Thus, should a polyurethane foam containing such particles ignite, then the particles immediately intumesce to form an ignition resistant barrier which is structurally rigid. There is very little weight loss. Thus, depolymerisation is reduced and the formation of molten liquid and significant volatalisation is avoided. Thus, flashover is prevented.

Although not wishing to be bound by theory, it is believed that the efficient fire retardant effects are obtained because, although the system allows an initial, very short ignition, this immediately triggers both the evolution of water and structural changes in the silicate caused by the intumescence to provide an immediate, structurally stable, thermal barrier which prevents propagation of the flame. There is thus a significant reduction in heat release, smoke and toxic fumes.

In particular, it is believed that the excellent fire retardant effect is achieved because the particles are of a size sufficiently large and are present in a sufficient amount that, on intumescence, they meet one another within the cells of the foam to produce a rigid thermally resistant inorganic foam structure. During this process the organic foam retains its original volume. This barrier protects the remaining polymer, so preventing further spread of the flame. Thus, on ignition, the rapid onset of intumescence prevents further depolymerisation, so preventing the formation of liquid and gaseous products. By this means the spread of the flame by burning molten liquid and flashover are avoided. Thus, although the foam is initially ignitable it is self-quenching, with a very low rate of heat output. Hence, there is a considerable reduction in heat and weight loss as compared with that achieved with conventional flame retardant additives. The thermally resistant barrier is also less fragile than barriers which may be produced by conventional additives.

The alkali metal silicate can be incorporated in any conventional polyurethane foam, be it rigid or flexible. However, it is especially suitable for incorporation into flexible foams because, in contrast to many conventional fire retardants, it does not adversely affect the desirable properties of such a foam.

In particular, it is still possible to obtain foams of low density, preferably 0.05–0.3g/cc, especially about 0.1g/cc.

The formation of urethane foams is somewhat complex and is thought to involve a series of chemical reactions leading to gas formation and molecular growth. In addition to the nature of the chemical reactions, the components of a foam system will also affect the colloidal chemistry of nucleation, bubble stability and the stability of the polymer as it cures.

It is especially surprising that neither the performance of such complex foaming systems nor the properties of the resulting foam are adversely affected by the presence of such relatively large silicate particles.

The reactive ingredients of a foam system are usually an isocyanate, a polyol, more usually a hydroxy-terminated resin, and water. Two types of processes are generally used for producing foam, namely the "one-shot" and the "two-shot" (prepolymer) processes.

In the "one-shot" process, the diisocyanate, polyol and water are all mixed simultaneously, together with suitable catalysts, stabilizers, cell size control agents and additional blowing agents if desired. The reaction begins immediately, the foam starting to rise about ten seconds after mixing and being complete within one or two minutes. The foam continues to cure for several hours, possibly a day or more.

In the "prepolymer" process an isocyanate and polyol are reacted to form a prepolymer, which is later foamed by reaction with water, when simultaneous growth of the molecular structure occurs. An inert blowing agent may also be used in small amounts to augment the foaming.

Whichever system is employed, the foam system usually contains one or more catalysts which have a major effect on the chemistry of the system. The catalyst serves to drive the reactions between the prepolymer and water, or between isocyanate, polyol and water at such rates that the foam rises and cures sufficiently quickly to prevent collapse of the foam.

The gas evolution and the polymer growth must be matched so that the gas is trapped efficiently and the polymer has sufficient strength at the gas evolution to maintain its volume without collapse or gross shrinkage.

In particular, one-shot systems normally employ a mixed catalyst system, for example, a tin catalyst for controlling the isocyanate/polyol reaction and a tertiary amine catalyst for controlling the isocyanate/water reaction.

The process of forming bubbles in a gas-liquid solution is often called nucleation and in most foam systems a nucleating agent, for example finely dispersed silicon oil especially of the dimethylsiloxane type, is also present.

It must be borne in mind that the presence of the flame retardant in such a system may have a significant effect upon the foaming process as well as the physical properties of the foam and its behaviour on burning.

According to one aspect of the invention there is provided a polyurethane foam containing a water soluble silicate particles having an average particle size of at least 62 micron, preferably at least about 70 micron.

More preferably, the silicate particles have an average particle size within the range of about 90–500 micron, especially about 100–450 micron, more especially 180 to 425 micron, the best results being achieved with an average particle size of 300–425 microns.

The silica particles are present in the polyurethane foam in an amount of at least 30 parts per 100 parts by weight of the polyol of the polyurethane, ie roughly at least 15% by weight of the total weight of the foam. More preferably the amount of silicate particles is at least 40, especially 60-100, parts per 100 parts by weight of the polyol. If the amount of silicate is too low, the intumescent effect is insufficient, while if too large, the excess is superfluous and detrimental to flexibility and other foam properties, such as a tendency to dust.

The silicate particles preferably contain at least 10 wt %, by weight of the particles, of water of hydration chemically bound within the structure. We find that, in contrast to known fire retardant additives which carry water, the presence of water in the silicate particles does not adversely affect the polymerization and/or foaming process.

It is preferred that the moisture content of the silicate is from 10–50%, more preferably 20–45%, especially about 40%, more especially 42%, by weight of the total weight of silicate and water. All of this moisture content may be provided by water of hydration, but a small amount of unbound water may be additionally present.

The silicate may be an alkali metal silicate, such as sodium, lithium or potassium silicate or may, for example, be ammonium or a lower tetraalkyl ammonium silicate. A sodium silicate is especially preferred.

Sodium silicate might be expressed as:

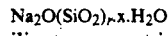

$$Na_2O(SiO_2)_r \cdot x \cdot H_2O$$

In a silicate present in a foam embodying the invention, r can be any value, not necessarily an integer. In effect, r represents the silica ($SiO_2$)/soda ($Na_2O$) ratio, which is preferably 1.

Thus, it is believed that the silica/soda ratio will affect the degree of intumescence and the temperature at which intumescence will take place. It will also affect the thermal conductivity of the structure formed by intumescence. We find that sodium metasilicate has the highest degree of intumescence at the lowest temperature, with the lowest thermal conductivity at that temperature.

The value of x will govern the moisture content of the silicate and in this regard, it is found that when r TM 1 the pentahydrate ($x = 5$) is especially preferred.

When silicates have been added to conventional foams, they have tended to have a "wet" feel and are somewhat slimy. Some improvement in feel has been obtained by adopting the "prepolymer" foaming system.

However, we have now found surprisingly that, whichever reaction system is adopted, an excellent "dry" feel to the foam can be obtained if the foam system additionally includes silica, especially silica gel. Surprisingly, again the presence of silica powder does not adversely affect the reaction kinetics.

The silica gel may be present in an amount such that the ratio of silicate/silica gel is from 1/1 to 5/1, especially 1.5/1 to 4/1, more especially 2/1 to 3/1.

The silicate, and any silica present, are preferably included in the foam by incorporating a silicate (and optionally silica) powder into the reaction mixture prior to foaming. In particular, this prevents the silicate from playing a sufficient role in the foaming reaction and thus avoids the formation of a significant quantity of inorganic foam, as may be obtained should the silicate be added as an aqueous solution. In particular, the one-shot system is preferred and it is especially preferred to include the silicate powder and any silica present in the polyol.

In general, we find that the degree and rate of intumescence are a function of particle size, amount, moisture content and silica/soda ratio of the silicate powder and temperature. For example, it may be possible to optimise the particle size in dependence upon the silica/soda ratio.

DETAILED DESCRIPTION OF THE INVENTION

The following Examples describe embodiments of the invention in more detail, and refer to accompanying drawings in which FIG. 1 provides a graphical comparison between the weight loss on combustion of polyurethane foams containing no additive (control), melamine (comparative)

and sodium metasilicate pentahydrate, hereinafter Metso (embodying the invention), and FIG. 2 provides a graphical comparison between the weight loss on combustion of a conventional foam containing no additive and foams containing different respective amounts of Metso.

EXAMPLE 1 — Foam Preparation

The foams were prepared by a "one-shot" process in which the following conventional formulation was used to produce a flexible polyurethane foam.

|   |   | Parts by weight |
|---|---|---|
| Caradol | (a polyether polyol, commercially available from Shell) | 100 |
| Water |   | 3.3 |
| Dabco | (1,4-diazabicyclo[2.2.2] octane, a tertiary amine catalyst commercially available from Air Products Ltd) | 0.4 |
| Silicone oil |   | 1.0 |
| Nuocure 2028 | (a stannous octoate, commercially available from Durham Chemicals) | 0.24 |
| TDI | (toluene diisocyanate) | 41.6 |

Several foams were prepared containing various additives or (for control) no additive. When the additive was included, this was incorporated in the polyol.

In each case, 10 grams of the polyol was used and the remainder of the premixed ingredients were weighed accurately into a polyethylene cup. The mixture was then premixed using a mechanical stirrer, stirring being continued until the mixture formed a milky thick suspension. This took about two minutes.

Thereafter, two drops of stannous octoate were added using a disposable pasteur pipette and immediately afterwards, the TDI was added using a Gilson pipette dispenser. The mixture was then stirred for about one minute, by which time rapid foaming had begun, and stirring was continued until the foam had filled half of the cup. The stirring was then stopped and the cup left standing overnight. The flexibility and texture of the foams was tested next day and the rate of combustion of the foam was determined after at least two weeks of curing.

EXAMPLE 2 — COMBUSTION TEST

An aluminium frame was placed on a top-pan balance and a gauze was placed on top of the frame. Approximately equally sized small cubic blocks of about 1-2 grams weight from the middle of the foam were cut out using scissors. For each test, a block was placed on the gauze, its weight recorded, and combustion started by igniting the foam using a fully aerated bunsen burner flame to which the foam was directly exposed for five seconds. After removal of the flame, regular recordings (every ten seconds) of the weight were taken and any physical changes and evolution of gases were noted. The time taken for the flame to reach a fully developed stage was also noted. If the flame became extinguished, then one minute after first removing the bunsen flame, the flame was again applied for five seconds and then removed and the observations repeated.

The combustibility of the residues was tested using the bunsen flame. The residue was brushed off the gauze and analysed for carbon, hydrogen and nitrogen (CHN). Any residue remaining on the gauze was then removed using a powerful torch bunsen prior to the next test.

EXAMPLE 3 - VARIATIONS IN PROCESS CONDITIONS

The effects of altering the amounts of free water from 0 to roughly 6.6 parts by weight (about twice the conventional amount) were studied. The formulation containing no water did not foam and remained as a thick milky mesh which later hardened to a semi-rigid mesh. As the water content was increased beyond the optimum, the rate of foaming, porosity, density and rigidity of the foam increased.

Variation in the amount of oil showed that there was no significant effect in changing the amount of oil from about 1 to about 1½% by weight of the total mixture, but higher additions lead to shrinkage of the foam. Omission of oil from the formulation resulted in a sticky mess with no foaming.

Increasing the pre-mixing time from two minutes to six minutes in one minute intervals made the premix texture thicker and milkier in colour and, for longer pre-mixing periods, a white suspension resulted. The significant changes which were observed were a slower rate of foaming and an increased rigidity of the final foam. Where pre-mixing took as long as five or six minutes, the foam shrunk slightly after a few hours standing.

Omission of the catalysts prevented foaming but increasing the catalyst content caused shrinkage of the foam.

EXAMPLES 4-13 — EFFECTS OF ADDITIVES

The following additives were incorporated in respective tests, with the following results. The amounts of additives given below are based on parts by weight per 100 parts by weight of polyol.

Examples 4-11 are comparative and include a control foam, with no additive (Example 4), foams containing some additions known to have fire retardant properties, such as melamine (Example 9), hydrated alumina (10) and anhydrous sodium metasilicate (Example 11) and foams containing some additives which because of their chemical constitution might have been useful as fire retardants, such as various cements (Examples 6-8) and fumed silica (Example 9). Examples 12 and 13 are in accordance with the invention.

EXAMPLE 4 (CONTROL)

A foam was prepared in accordance with Example 1, without the presence of a fire retardant additive. A flexible foam having desirable physical characteristics was obtained. After applying the bunsen burner to the foam for five seconds and then removing it, the foam continued to burn steadily at an increasing rate.

EXAMPLE 5 - MELAMINE

A fine white melamine powder was incorporated in an amount of 60 pbw. A good flexible foam resulted, but this was slightly wet and slightly crumblier than the control foam. The foam had good fire retardancy. Thus, after contact with the flame for 5 seconds and subsequent removal of the flame, there was an induction period during which the foam burned with only a small flame. However, thereafter, the flame developed before extinguishing itself after about 40 seconds. The weight loss was 78%.

EXAMPLE 6 - OPC (ORDINARY PORTLAND CEMENT)

Tests were carried out using foams containing 10, 30 and 60 pbw OPC. In all cases, the foam was "wet" and shrinkage was observed. Increasing the mixing time decreased the degree of shrinkage, but the resultant foam was rigid and hard. The foam burned more quickly than the control foam. This appeared to be due to a wicking action in which the OPC provided a structure which served as a wick encouraging flow of molten foam material. The ignition was rapid and the time interval between ignition to a well-developed flame was more rapid than for the control foam.

EXAMPLE 7 — CEMENT

A dry cement (11.2 g/2.5 ml $H_2O$) and a wet cement (20 g/10 ml $H_2O$) were prepared and incorporated in respective foams. Tests were carried out using 5 and 30 pbw of both wet and dry cement. For the wet cement, the foaming was successful but the texture was extremely crumbly, very wet and went to pieces. After application of the flame for five seconds and its subsequent removal, the foams burned much faster than the control foam and OPC foams; in other words the time between ignition and build up to a full flame was much shorter, this being almost instantaneous. The foams containing the dry cement were still wet and crumbly and burned in a very similar manner to those containing wet cement.

EXAMPLE 8 - ALUMINA CEMENT

Three types of alumina cement were tested, namely Secar 51, Secar 71 and Secar 80 containing 51-80% alumina. The cement was included in an amount of 60 pbw. The foams burned more quickly than the control and the foams containing OPC cement, the full flame being attained after about 10 seconds. As the $Al_2O_3$ content decreased, the rate of combustion decreased.

EXAMPLE 9 — FUMED SILICA

Aerosil 380, a flaky and very light white particulate material was used in an amount of 40 pbw. However, no foaming was obtained.

EXAMPLE 10 — HYDRATED ALUMINA

This was included as a fine white powder in respective amounts of 30 and 60 pbw. Again, both foams shrank slightly on standing. After applying the bunsen burner to the flame for five seconds and removing it, the foams continued to burn.

EXAMPLE 11 — ANHYDROUS SODIUM METASILICATE

A fine solid powder of about 100 mesh (152 micron) size was included in amounts of 20-60 pbw. However, the foam shrunk and had a "wet" feel. Further addition of inorganic salt (anhydrous $K_2CO_3$) in a ratio of 3/1 (metasilicate (30 pbw)/$K_2CO_3$) improved the foaming (half a cup was obtained), but the foam later shrunk.

EXAMPLE 12 — METSO

Particles having an average size in the range 100-500 micron were incorporated in amounts of 0.3, 20, 30, 60 and 100 pbw. A successful foaming was obtained in all cases, levels of at least 60 pbw giving an excellent flame retardant formulation. Indeed, when at least 60 pbw were present, a weight loss of only 9% occurred after repeated contact with the flame for five seconds every minute for 250 seconds.

EXAMPLE 13 — METSO/SILICA GEL

Various combinations of silica gel of a particle size of about 100 microns and Metso were tested, including the following Metso/silica gel proportions, namely 50/20, 60/20 and 60/30. Foaming of a mixture containing about 60 pbw of total additive was fairly easy, but as the amount increased, it became more difficult to mix in the stannous octoate and TDI. Increasing the amount of silica gel from 10 to 30 pbw (for 60 pbw Metso) did not have any significant affect on the dryness of the foam. A 60/20 mixture was found to be reasonable, this giving a foam which was fairly flexible, reasonably dry and having as excellent a fire resistance as that of the foams of Example 12 containing at least 60 pbw of Metso.

EXAMPLE 14 — INFLUENCE OF PARTICLE SIZE

Metso was ground up and 60/20 combinations of Metso/silica gel were employed in which the approximate average particle size of the Metso was $>450 \mu m$, $>300 \mu m$, $>100 \mu m$, $>45 \mu m$ and $<45 \mu m$. In general, as the particle size decreased, foaming rate increased, but wetness and combustion increased. A foam having excellent fire retardancy was obtained when the particle size was $>45 \mu m$.

EXAMPLE 15 — EFFECT OF WATER ON FLAME RETARDED FOAMS

A foam containing a mixture of 60 pbw Metso/20 pbw silica gel was dipped into a bowl of water and held below it for two minutes. It appeared to have soaked up some of the water. It was allowed to dry at room temperature. Next day, the foam appeared to have dried off completely and was as flexible as a sample which had not been immersed in water. Immersion caused no visible changes. In common with another sample of the foam which had not been immersed in water, the foam did not burn.

From the above, it can be seen that a foam containing Metso having an average particle size of at least 45 micron, especially at least 100 micron and present in an amount of at least 60 pbw per 100 parts glycol gave excellent flame retardancy, while retaining the desired flexibility and "feel" of the foam. This contrasted with the results obtained for many other foams containing conventional additives.

EXAMPLE 16

Example 12 was repeated using samples of METSO having different respective particle sizes and the resulting foams were subjected to a combustion test, which was the same as that of Example 2, except where stated otherwise, with the following results. cl SAMPLE 1 ($<63 \mu m$)

Up to 190 seconds, steady burning took place with little smoke. Weight loss: 2.2g to 0.8g. The flame was extinguished at 195 seconds. The flame was applied again ("reheated") at 225 seconds. Final mass 0.7 g at 240 seconds.

SAMPLE 2 (63-90 $\mu m$)

Up to 150 seconds, steady burning took place with little smoke. Weight loss was 1.6 to 0.6 g when flame extinguished. Reheated at 180 seconds but only charred mass left.

SAMPLE 3 (90–180 μm)

Flame extinguished at 8 seconds. Weight loss: 2.1 g to 2.0 0g. Reheated at 60 seconds. Small flame developed from 60 seconds to 310 seconds. Weight loss 2.0 g to 0.8 g. Reheated at 360 seconds, then 420 seconds but only charred mass left.

SAMPLE 4 (130–300 μm)

Flame extinguished at 30 seconds. Reheated at 60 seconds. Weight loss 2.1 g to 1.9 g. Slight charring, extinguished at 90 seconds. Reheated at 120 seconds (mass 1.7 g) extinguished at 130 seconds. Reheated at 180 seconds (mass 1.6 g), burnt with a small, poorly developed flame until 230 seconds. Reheated at 240 seconds (mass 1.4 g), extinguished at 280 seconds (1.3 g).

SAMPLE 5 (300–425 μm)

Flame extinguished at 13 seconds. Reheated at 60 seconds, extinguished at 75 seconds (slight charring).

Weight loss 2.2 g to 2.0 g. Reheated at 120 seconds, extinguished at 150 seconds (1.7 g). Reheated at 180 seconds but no flame. Reheated at 200 seconds, small flame formed, which extinguished at 270 seconds. Reheated at 300 seconds, flame extinguished at 302 seconds (1.6 g). Reheated at 360 seconds, flame extinguished at 390 seconds (1.4 g). Reheated at 420 seconds with no mass loss.

SAMPLE 6 (425–600 μm)

Flame extinguished (weight loss 2.1 g to 1.9 g). Reheated at 60 seconds, small flame but extinguished at 80 seconds. Reheated at 120 seconds. Weight loss 1.8 to 1.6 g. Flame extinguished at 150 seconds. Reheated at 180 seconds. Weight loss 1.6 g to 1.4 g and extinguished at 210 seconds. Reheated at 240 seconds. Weight loss 1.4 g to 1.3 g and extinguished at 270 seconds. Reheated at 300 seconds. Weight loss 1.3 g to 1.1 g (340 seconds) then extinguished.

Sample 6 lost 1.0 g in 340 seconds compared with only 0.6 g in 390 seconds in Sample 5. This shows that the optimum particle size had been exceeded The results show that PU flammability depends upon the particle size of the flame retardant additive. The maximum effect is found with particles in the range 300–425 μm, although good results are obtained using a particle size range of 180–300 μm. It was not possible to produce stable foams with particles of Metso greater than 600 μm.

In order to illustrate this even more fully, reference is made to FIGS. 1 and 2.

FIG. 1 shows that on subjecting a control foam, namely a conventional flexible foam as prepared in Example 1 with no additive, to a naked, fully aerated bunsen burner flame for five seconds to cause ignition, almost 50% weight loss occurred, nearly all of this occurring within the first 100 seconds. Combustion was incomplete owing to the tendency of the conventional flexible foams to melt and drip during combustion.

The incorporation of a conventional melamine flame retardant, in an amount of 60 pbw per 100 pbw polyol, delayed the onset of ignition, but once ignition had occurred, an even greater weight loss occurred.

In contrast to all this, when including Metso having an average particle size in the range 100–500 micron in an amount of 60 pbw per 100 pbw polyol, no significant weight loss occurred even after five repeated application of the bunsen burner at intervals of one minute.

FIG. 2 shows the effects of adding different amounts of Metso, namely 0.3, 20 and 60 pbw per 100 parts polyol, and illustrates that the results are non-linear, a critical amount of at least 60 pbw per 100 pbw polyol being required in order to achieve the desired flame retardant effect.

From the above, it can be seen that foams embodying the invention have the combined properties of low thermal conductivity, low bulk density and high water resistance.

We claim:

1. A foam of a polyurethane derived from a polyol and a polyisocyanate, which foam contains water-soluble silicate particles in an amount of at least 30 parts per 100 parts by weight of the polyol of the polyurethane, which silicate particles have an average size of from 90 to 450 microns inclusive and contain at least 10% by weight of the particles of water of hydration.

2. A polyurethane foam according to claim 1, wherein the silicate particles have an average size of from 100 to 450 microns inclusive.

3. A poly urethane foam according to claim 2, wherein the silicate particles have an average size of from 180 to 425 microns inclusive.

4. A polyurethane foam according to claim 3, wherein the silicate particles have an average size of from 300 to 425 microns inclusive.

5. A polyurethane foam according to claim 1, wherein the silicate is present in an amount of at least 40 parts per 100 parts by weight of the polyol.

6. A polyurethane foam according to claim 5, wherein the silicate is present in an amount of from 60 to 100 parts by weight per 100 parts by weight of the polyol.

7. A polyurethane foam according to claim 1 containing from 10 to 50% water of hydration by weight of the total weight of silicate and water.

8. A polyurethane foam according to claim 1, wherein the silicate is an alkali metal silicate.

9. A polyurethane foam according to claim 8, wherein the alkali metal is sodium.

10. A polyurethane foam according to claim 9, wherein the $SiO_2/Na_2O$ molar ratio is 1.

11. A polyurethane foam according to claim 10, wherein the silicate is sodium metasilicate pentahydrate.

12. A polyurethane foam according to claim 1, which is a flexible foam.

13. A polyurethane foam according to claim 1, which additionally contain particles of silica.

14. A polyurethane foam according to claim 13, wherein the silica is in the form of a gel.

15. A polyurethane foam according to claim 1, wherein the silicate is added as a powder to the reaction medium prior to foaming.

16. A polyurethane foam according to claim 15, wherein the foam is prepared by a one-shot foaming system.

17. A polyurethane foam according to claim 16, wherein the silicate powder is added to the polyol in the form of a powder.

18. A method of preparing a fire retardant polyurethane foam which comprises incorporating, in a polyol, water-soluble silicate particles in an amount of at least 30 parts per 100 parts by weight of the polyol, which said silicate particles have an average size of from 90 to 450 microns inclusive and containing at least 10% by weight of the particles of water of hydration, and, in the presence of a foaming agent, reacting the polyol with a polyisocyanate to obtain the fire retardant polyurethane foam.

19. A polyurethane foam according to claim 1, wherein the particles are free of a coating.

20. A method according to claim 18, wherein the particles are free of a coating.

* * * * *